(12) United States Patent
Nishiyama

(10) Patent No.: US 8,898,649 B2
(45) Date of Patent: Nov. 25, 2014

(54) APPLICATION PROGRAM ANALYSIS METHOD, ANALYSIS SYSTEM AND RECORDING MEDIUM FOR IDENTIFYING A CONTRIBUTING FACTOR FOR AN INVALID OPERATION OF AN APPLICATION PROGRAM

(75) Inventor: Hiroyasu Nishiyama, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 220 days.

(21) Appl. No.: 13/699,151

(22) PCT Filed: Jul. 23, 2010

(86) PCT No.: PCT/JP2010/062442
§ 371 (c)(1),
(2), (4) Date: Jan. 31, 2013

(87) PCT Pub. No.: WO2011/151931
PCT Pub. Date: Dec. 8, 2011

(65) Prior Publication Data
US 2013/0212565 A1 Aug. 15, 2013

(30) Foreign Application Priority Data

Jun. 2, 2010 (JP) ................................. 2010-126954

(51) Int. Cl.
G06F 9/44 (2006.01)
G06F 11/00 (2006.01)
G06F 17/30 (2006.01)
G06F 11/36 (2006.01)

(52) U.S. Cl.
CPC ...... *G06F 11/3612* (2013.01); *G06F 17/30286* (2013.01)
USPC ........................... 717/131; 717/124; 714/38.1

(58) Field of Classification Search
CPC ............ G06F 11/3604; G06F 11/3612; G06F 17/30286
USPC ........................... 717/124–135; 714/37, 38.1
See application file for complete search history.

(56) References Cited

U.S. PATENT DOCUMENTS 6,173,440 B1 * 1/2001 Darty ........................... 717/130
7,617,489 B2 * 11/2009 Peyton et al. ................. 717/133
(Continued)

FOREIGN PATENT DOCUMENTS

JP 06-175884 6/1994
JP 09-282173 10/1997
(Continued)

OTHER PUBLICATIONS

Linton M.A., "The Evolution of Dbx," Proceedings of the 1990 Summer USENIX Conference, 1990, pp. 1-12.
(Continued)

*Primary Examiner* — Qing Chen
(74) *Attorney, Agent, or Firm* — Foley & Lardner LLP

(57) ABSTRACT

Disclosed is a method for analyzing a program that includes database operation statements, including: a first procedure for analyzing control flow of a program and data used in the program, on the basis of the program and the execution result of the program; a second procedure for analyzing the dependency relationship among a plurality of database operation statements, in accordance with the analysis result of the first procedure and the operation details of the plurality of database operation statements; a third procedure for analyzing the propagation path of the incorrect operation in the opposite direction to the control flow, on the basis of the analysis result of the first procedure and the analysis result of the second procedure and taking as a starting point for analysis a predetermined program location which is operating incorrectly; and a fourth procedure for displaying program statements on the propagation path obtained by the third procedure.

8 Claims, 16 Drawing Sheets

(56) References Cited

U.S. PATENT DOCUMENTS

| | | | |
|---|---|---|---|
| 2005/0204344 A1* | 9/2005 | Shinomi | 717/124 |
| 2008/0072214 A1* | 3/2008 | Peyton et al. | 717/133 |
| 2009/0106063 A1* | 4/2009 | Minsky et al. | 705/7 |
| 2009/0183141 A1 | 7/2009 | Tai et al. | |
| 2009/0193401 A1* | 7/2009 | Balakrishnan et al. | 717/144 |

FOREIGN PATENT DOCUMENTS

| | | |
|---|---|---|
| JP | 2002-108649 | 4/2002 |
| JP | 2002-342110 | 11/2002 |
| JP | 2006-185324 A | 7/2006 |
| JP | 2008-502046 A | 1/2008 |
| WO | WO 2005/121953 A1 | 12/2005 |

OTHER PUBLICATIONS

Livshits et al. "Finding Security Vulnerabilities in Java Applications with Static Analysis," Proceedings of the 14$^{th}$ Conference on USENIX Security Symposium, 2005; 16 pages.

Aho et al., Compilers: Principles, Techniques, & Tools, Table of Contents; 2d Ed., Jun. 2006, Pearson, Addison Wesley; pp. ix-xxiv.

PCT International Search Report on application PCT/JP2010/062442 mailed Feb. 1, 2011; 2 pages.

* cited by examiner

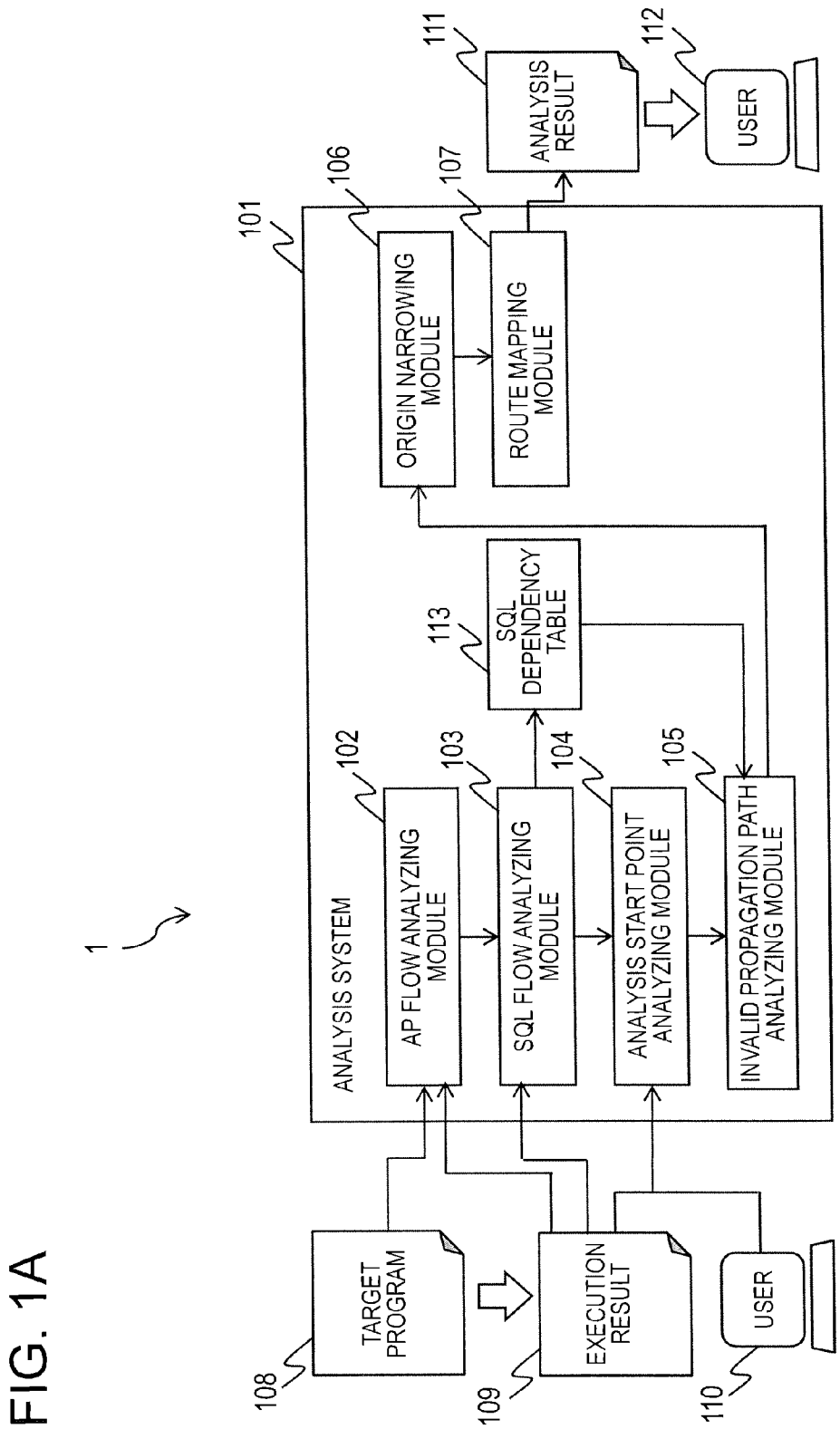

FIG. 9

```
class C0 {
  public String m0(Statement stmt, String t0) {
    ...
    v0 = INVALID VALUE; // (a)
    ...
    // GENERATION OF SQL UPDATE STATEMENT
    String s0 = "update "+t0+" set item="+v0; // (b)
    ...
    // EXECUTION OF SQL UPDATE STATEMENT
    stmt.update(s0); // (c)
  }
  public String m1(Statement stmt, String t1) {
    ...
    // GENERATION OF SQL SELECT STATEMENT
    String s1 = "select * from "+t1+" ..."; // (d)
    ...
    // EXECUTION OF SQL SELECT STATEMENT
    v1 = stmt.query(s1); // (e)
    ...
    // OUTPUTTING OF QUERY RESULT
    out.println(v1); // (f)
  }
} public doPost(HttpServletRequest req,
              HttpServletResponse resp) {
  ...
  C0.m0(stmt, "T"); // (g)
  ...
  C0.m1(stmt, "T"); // (h)
  ...
}
```

| | | | |
|---|---|---|---|
| ROUTE | (g)→(a)→(b)→(c)→(h)→(d)→(e)→(f) | | |
| VARIABLE | STATEMENT | VARIABLE NAME | VALUE |
| | (a) | v | INVALID VALUE |
| | (b)(c) | s0 | "update T set item=< INVALID VALUE >" |
| | (d)(e) | s1 | "select * from T ..." |
| | (f) | v1 | UNKNOWN |

FIG. 11

| | PRECEDING OPERATION | | |
|---|---|---|---|
| SUBSEQUENT OPERATION | | SELECT | UPDATE | ... |
| | SELECT | × | ○ [SAME TABLE] | ... |
| | UPDATE | × | ○ [SAME TABLE] | ... |
| | ... | ... | ... | ... |

FIG. 12

| ANALYSIS START POINT | REFERENCE SET R | DEFINITION STATEMENT SET Q | PATH SET |
|---|---|---|---|
| (f) | {v1} | {(e)} | {(h)⇒(d)⇒(e)⇒(f), (g)⇒(b)⇒(c)⇒(e)⇒(f), (a)⇒(b)⇒(c)⇒(e)⇒(f)} |
| (e) | {s1} | {(d),(c)} | {(h)⇒(d)⇒(e), (g)⇒(b)⇒(c)⇒(e), (a)⇒(b)⇒(c)⇒(e)} |
| (d) | {t1} | {(h)} | {(h)⇒(d)} |
| (c) | {s0} | {(b)} | {(g)⇒(b)⇒(c), (a)⇒(b)⇒(c)} |
| (b) | {t0,v0} | {(g),(a)} | {(g)⇒(b),(a)⇒(b)} |
| (a) | - | - | - |
| (g) | - | - | - |
| (h) | - | - | - |

FIG. 13

| ITEM NUMBER | EDGE |
|---|---|
| #1 | (h)⇒(d) |
| #2 | (d)⇒(e) |
| ... | ... |

FIG. 15

```
class C0 {
    public String m0(Statement stmt, String t0) {
        ...
        v = INVALID VALUE; // (a)
        ...
        // GENERATION OF SQL UPDATE STATEMENT
        String s0 = "update "+t0+" set item="+v0; // (b)
        ...
        // EXECUTION OF SQL UPDATE STATEMENT
        stmt.update(s0); // (c)
    }
    public doPost(HttpServletRequest req,
                  HttpServletResponse resp) {
        ...
        m0(stmt, "T"); // (d)
        ...
    }
}
```

1101

```
class C1 {
    public String m1(Statement stmt, String t1) {
        ...
        // GENERATION OF SQL SELECT STATEMENT
        String s1 = "select * from "+t1+" ..."; // (e)
        ...
        // EXECUTION OF SQL SELECT STATEMENT
        v1 = stmt.query(s1); // (f)
        ...
        // OUTPUTTING OF QUERY RESULT
        out.println(v1); // (g)
    }
    public doPost(HttpServletRequest req,
                  HttpServletResponse resp) {
        ...
        m1(stmt, "T"); // (h)
        ...
    }
}
```

FIG. 17

| TIME | EVENT |
|---|---|
| 01/01 08:10:00 | ... |
| 01/01 08:15:08 | CALL C0.doPost |
| 01/01 13:24:39 | CALL C1.doPost |
| 01/02 20:10:49 | ... |
| ... | ... |

FIG. 18

```
void dummy() {
    C0.doPost(...); // (i)
    C1.doPost(...); // (j)
}
```

| ROUTE | (i)→(d)→(a)→(b)→(c)→(j)→(h)→(e)→(f)→(g) | | |
|---|---|---|---|
| VARIABLE | STATEMENT | VARIABLE NAME | VALUE |
| | (a) | v | INVALID VALUE |
| | (b)(c) | s0 | "update T set item=< INVALID VALUE >" |
| | (e)(f) | s1 | "select * from T ..." |
| | (g) | v1 | UNKNOWN |

| ITEM NUMBER | EVENT |
|---|---|
| #1 | call C0.doPost |
| #2 | call C1.doPost |
| #3 | Exception in thread "main" java.lang.NullPointerException<br>       at Value.compute(Value.java:40)<br>       at C2.m2(C2.java:71) |
| #4 | ... |

FIG. 22

```
class C2 {
 public String m2(Statement stmt, String t1) {
  ...
  // GENERATION OF SQL SELECT STATEMENT
  String s1 = "select * from "+t1+"..."; // (a)
  ...
  // EXECUTION OF SQL SELECT STATEMENT
  v1 = stmt.query(s1); // (b)
  ...
   try {
       v1.compute(); // (c)
   }
  catch(Exception e) {
     ... // (d)
   }
  }
 }
}
```

APPLICATION PROGRAM ANALYSIS METHOD, ANALYSIS SYSTEM AND RECORDING MEDIUM FOR IDENTIFYING A CONTRIBUTING FACTOR FOR AN INVALID OPERATION OF AN APPLICATION PROGRAM

BACKGROUND

This invention relates to a method of analyzing an application and, more particularly, to a method of identifying the contributing factor for an invalid operation of a program in a 3-tier architecture Web application.

As a method of implementing an application in a Web system, 3-tier architecture is widely popular which configures an application from three layers: a Web layer, a logic layer, and a database layer. In 3-tier architecture, a service is realized as a serial combination of user interface presentation, an action in response to an input, and data operation corresponding to the action. Various Web systems are configured generally by combining a plurality of such services.

The increase in program scale and intricacy in recent years is making programs of the logic layer out of the 3-tier architecture complicate. On the other hand, there are many cases where the specifications of a program do not match the actuality of the software and cases where program specifications are not created in the first place due to frequent changes to specifications, man-hour reduction, hurried development/maintenance, and other reasons. This results in a situation where debugging and maintenance in program development take longer time.

A conventional way to avoid this situation is to understand the specifications of a program based on source code of the program and create a revision plan founded on the specifics thereof. The understanding of program specifications has been assisted with the use of such measures as a source code analysis tool which outputs a call relation (call graph) of steps in a program based on a static analysis result of the program, a program tracing tool which outputs a dynamic call relation of steps, and interactive execution trace of a program by a source-level debugger (See Non Patent Literature 1).

Generally speaking, a malfunction of a program is manifested as an error in control flow caused by erroneous control logic in the program, or data value invalidity caused by erroneous calculation logic in the program. The former can be verified by going over the control flow of the program with a source code analysis tool or a program tracing tool and checking whether or not actual operation is consistent with expected operation. The latter can be verified by stopping the execution of the program with a source code debugger at each execution point in time, and checking the value of a variable or the like.

In a service realized by the 3-tier architecture, program source code of the logic layer can be checked interactively by using a source-level debugger. Processing of a database layer program, on the other hand, can be carried out generally by issuing a command written in SQL, which is a database processing language, from a logic layer application to a database layer application.

The SQL command issued by the logic layer application is treated as string data and constructed dynamically in the logic layer program. The operation of the logic layer can therefore be checked by understanding what SQL statement is executed as the logic layer program is executed as well as the process of execution of the logic layer program, and using program tracing or an interactive debugger in combination. The overall operation of the programs of the 3-tier architecture can thus be checked.

Beside this method of detecting malfunction of a program by understanding the operation of the program, there is a method of detecting the vulnerability of a program via a static analysis of the program (see Non Patent Literature 2). Non Patent Literature 2 discloses a method using a data flow analysis approach to verify whether or not there is a data flow to an API that could give rise to a security problem, such as reference to a database from user input data or other types of low-reliability data. This method estimates that there is security vulnerability when a step that guarantees security is not found at some point in the data flow. According to this method, a problem of a program can be detected in a short time without needing the trouble of understanding program specifications in detail.

There is also a technology with which a module that verifies security vulnerability in this manner can be applied to a plurality of programming languages (see Patent Literature 1). Patent Literature 1 discloses means for providing a versatile security analysis module which is targeted for a plurality of programming languages including Java and PL/SQL. This technology once converts a plurality of programming languages into a uniform internal expression and applies analysis processing to the internal expression obtained by the conversion, thus realizing a versatile security analysis module.

Patent Literature 1 JP 2008-502046 A

Non Patent Literature 1 M. Linton. The Evolution of Dbx, In Proceedings of the 1990 Summer USENIX Conference, 1990.

Non Patent Literature 2 V. Livshits, et al., Finding Security Vulnerabilities in Java Applications with Static Analysis, In Proceedings of the 14th Conference on USENIX Security Symposium, 2005.

Non Patent Literature 3 Aho et al., Compilers: Principles, Techniques, & Tools, second edition, Addison-Wesley, 2006.

SUMMARY

The conventional technology described above, however, has a problem in that it is difficult to identify the spot of the cause of program malfunction, program vulnerability, or the like in a 3-tier architecture Web application.

Specifically, the method of using an interactive debugger to understand program specifications takes a long time in identifying the spot of the cause of malfunction out of the entire program if the understanding of program specifications is shallow. Particularly in a program that involves data access such as a 3-tier architecture Web application, understanding program specifications is made more difficult by the fact that a data access command is constructed dynamically through the execution of the program.

The method of detecting the vulnerability of a program via a static analysis of the program is capable of detecting program vulnerability but cannot identify the spot of the cause of program vulnerability. In the case of a Web application where a program is constituted of a plurality of services, in particular, interaction among the plurality of services needs to be taken into consideration, which makes it more difficult to identify the spot of the cause of program vulnerability than in a single service or program.

This invention has been made in view of the problems described above, and it is therefore an object of this invention to provide an application analysis method for easily identifying the spot of the cause of program malfunction, program vulnerability, or the like in a 3-tier architecture application.

A representative example of the invention disclosed in this application is an application program analysis method to be used by an analysis system that includes a processor for executing a program and a memory for storing the program executed by the processor for analyzing an application program that includes a database operation statement, the application program analysis method including: a first step of analyzing, by the processor, a control flow of the application program and data used in the application program based on the application program and on an execution result of the application program; a second step of analyzing, when the application program includes a plurality of database operation statements, by the processor, a dependency relation among the plurality of database operation statements based on a result of the analysis of the first step and specifics of operations of the plurality of database operation statements; a third step of analyzing, by the processor, based on the result of the analysis of the first step and a result of the analysis of the second step, a propagation route of an invalid operation of the application program by using, as an analysis start point, a given spot of the invalid operation in the application program and following the control flow backwards; and a fourth step of presenting, by the processor, program statements on the propagation path obtained in the third step.

According to this invention, the spot of the cause of program malfunction, program vulnerability, or the like can be identified with ease in a 3-tier architecture application.

BRIEF DESCRIPTION OF DRAWINGS

FIG. 1A is a diagram illustrating the schematic configuration of a computer system according to a first embodiment of this invention.

FIG. 9 is a diagram illustrating a target program according to the concrete example of the first embodiment of this invention.

FIG. 10 is a diagram illustrating a result of an analysis performed by an AP flow analyzing module on the target program according to the concrete example of the first embodiment of this invention.

FIG. 11 is a diagram illustrating an example of a table that is used by the SQL flow analyzing module to analyze dependency between two SQL operation statements according to the concrete example of the first embodiment of this invention.

FIG. 12 is a diagram illustrating path sets that are obtained by the invalid propagation path analyzing module according to the concrete example of the first embodiment of this invention.

FIG. 13 is a diagram illustrating an example of not-presented edge sets according to the concrete example of the first embodiment of this invention.

FIG. 15 is a diagram illustrating a target program according to a concrete example of a second embodiment of this invention.

FIG. 17 is a diagram illustrating an example of an execution log list according to the concrete example of the second embodiment of this invention.

FIG. 18 is a diagram illustrating a temporary call program according to the concrete example of the second embodiment of this invention.

FIG. 21 is a diagram illustrating an example of execution log sets according to a concrete example of the third embodiment of this invention.

FIG. 22 is a diagram illustrating a target program according to the concrete example of the third embodiment of this invention.

DESCRIPTION OF EMBODIMENTS

Embodiments of this invention are described below with reference to the drawings.

(First Embodiment)

A first embodiment of this invention is described first.

Figure 1B:
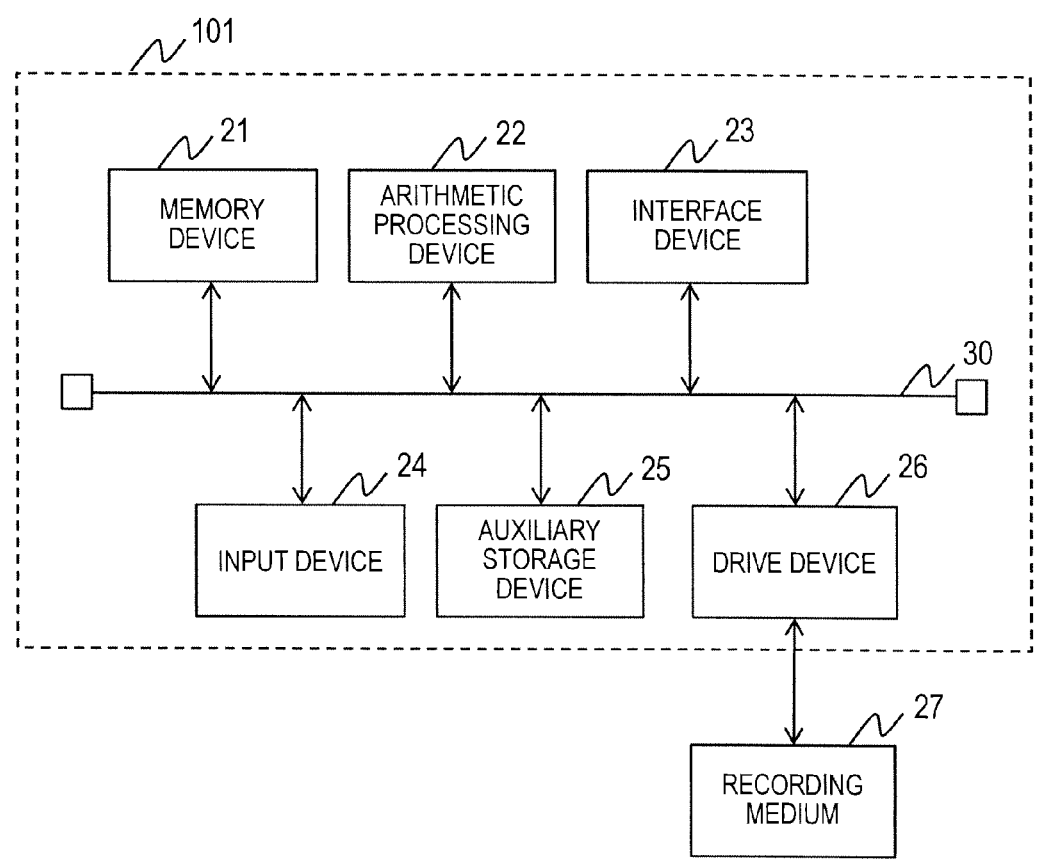
FIG. 1B is a diagram illustrating the configuration of an analysis system according to the first embodiment of this invention.

FIG. 1A is a diagram illustrating the schematic configuration of a computer system 1 according to the first embodiment of this invention. FIG. 1B is a diagram illustrating the configuration of an analysis system 101 according to the first embodiment of this invention.

As illustrated in FIG. 1A, the analysis system 101 includes an AP flow analyzing module 102, an SQL flow analyzing module 103, an analysis start point analyzing module 104, an invalid propagation path analyzing module 105, an origin narrowing module 106, a route mapping module 107, and an SQL dependency table 113.

As illustrated in FIG. 1B, the analysis system 101 is a computer device that includes a memory device 21, an arithmetic processing device 22, an interface device 23, an auxiliary storage device 25, an input device 24, and a drive device 26, which are connected to one another by a bus 30. The memory device 21 is a storage device such as a random access memory (RAM) that reads and stores programs stored in the auxiliary storage device 25 (programs for executing respective processing steps of the modules 102 to 107 of FIG. 1A), among other programs, when the analysis system 101 is booted up. The memory device 21 also stores a file necessary to execute a program, data about results of the respective processing steps of the modules 102 to 107, and others. The arithmetic processing device 22 is a central processing unit (CPU) or other types of arithmetic processing device for executing a program that is stored in the memory device 21. The interface device 23 is an interface device for coupling to an external network or the like. The input device 24 is an input device that provides a user interface (for example, a keyboard and a mouse). The auxiliary storage device 25 is a hard disk drive (HDD) or other types of storage device for storing a program, a file, data, and the like. The drive device 26 is a device that reads a program recorded on a recording medium 27. The program read by the drive device 26 is installed in the auxiliary storage device 25. The recording medium 27 is a recording medium such as a Universal Serial Bus (USB) memory or an SD memory card that records the program described above or the like.

Returning to FIG. 1A, the analysis system 101 outputs (presents) an analysis result 111 to a user terminal 112, which is coupled to the analysis system 101 via a network (not shown). A target program 108 is a program to be analyzed by the analysis system 101. The target program 108 runs based on instructions from a user terminal 110, and outputs an execution result 109 in the form of an execution log or the like. The target program may run on other systems than the analysis system 101.

The AP flow analyzing module 102 has as an input the target program 108 and the execution result 109 and, based on the target program 108 and the execution result 109, analyzes the flow of control (control flow) of the target program 108 and the value of a variable at each execution point in time of the target program 108. The AP flow analyzing module 102 is realized by, for example, the technology disclosed in Non Patent Literature 3.

The SQL flow analyzing module 103 analyzes, based on a result of an analysis by the AP flow analyzing module 102 and the execution result 109, SQL commands that are executed respectively by SQL operation statements (SQL execution statements) written in the target program 108 and the execution order relation among the SQL commands. The SQL flow analyzing module 103 stores in the SQL dependency table 113 information that indicates the execution order relation among the SQL commands obtained as a result of the analysis.

Figure 2:
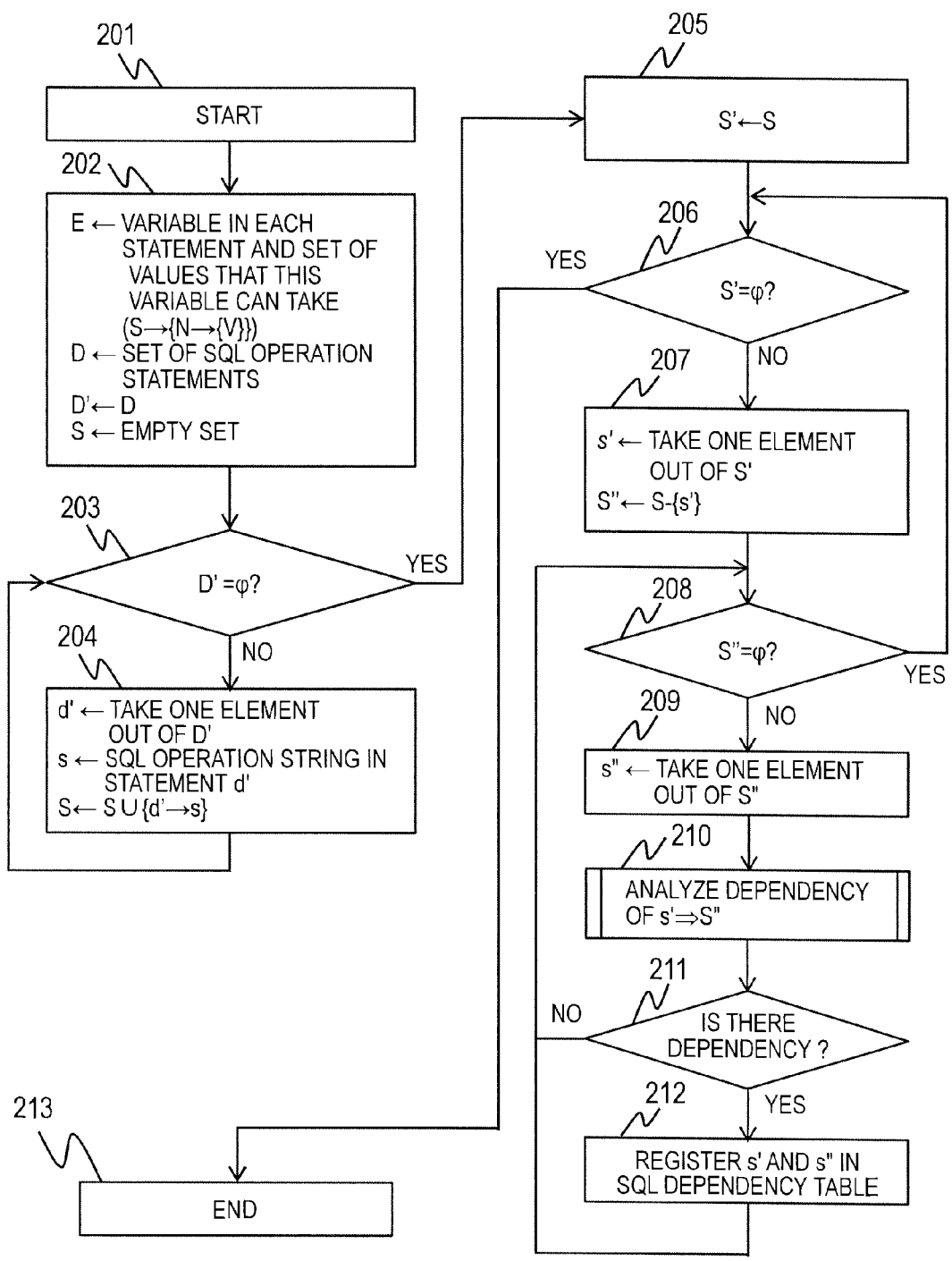
FIG. 2 is a flow chart illustrating control logic of an SQL flow analyzing module according to the first embodiment of this invention.

FIG. 2 is a flow chart illustrating control logic of the SQL flow analyzing module 103 according to the first embodiment of this invention.

The SQL flow analyzing module 103 first starts processing in processing 201 (201). In the next processing 202, the SQL flow analyzing module 103 stores, for each statement S (processing step) in the target program 108, a variable N in the statement S and a set {V} of values V that the variable N can take, in a variable E, which represents a set (hereinafter referred to as "set E") (202). Elements of the set E are expressed as (S→{N→{V}}), which is obtained by mapping, from the relevant statement S, (N→{V}), which expresses mapping from the variable N to the set {V} of values V. The processing 202 also includes storing a set of SQL operation statements in the target program 108 in variables D and D', which represent sets (hereinafter referred to as "sets D and D'"), and performing initialization by setting up a variable S, which represents a set (hereinafter referred to as "set S"), as an empty set. The set of SQL operation statements which is stored in the sets D and D' is obtained by obtaining calls of SQL operation steps that are defined in various programming languages or libraries.

The SQL flow analyzing module 103 then determines whether or not the set D' is an empty set (203). When the set D' is not an empty set (NO in 203), the SQL flow analyzing module 103 proceeds to processing 204 to take one element (SQL operation statement) out of the set D' and store the element in a variable d' (204). The processing 204 also includes storing, in a variable s, an SQL operation string in the SQL operation statement that has been stored in the variable d'. For example, in the case where the SQL operation statement is "stmt.executeQuery(sql)", the SQL operation string is the value of a variable sql (e.g., "select * from T"). The SQL operation string is obtained by referring to the mapping relation that has been obtained by the AP flow analyzing module 102 for the variable N in the statement d' and the set {V} of values V that the variable N can take. Thereafter, ({d'→s}) which is mapping from the variable d' to the variable s is added to the set S.

When the set D' is an empty set in processing 203 (YES in 203), on the other hand, the SQL flow analyzing module 103 proceeds to processing 205, where the SQL flow analyzing module 103 stores the set S (a set of mapping from the respective SQL operation statements to SQL operation strings) in a variable S', which represents a set (205).

The SQL flow analyzing module 103 obtains, through the processing 201 to processing 205 described above, the sets S and S' which are sets of mapping from the respective SQL operation statements in the target program 108 to SQL operation strings.

The SQL flow analyzing module 103 then determines whether or not the set S' is an empty set (206). When the set S' is an empty set (YES in 206), there is no more SQL operation statement to be analyzed and the entire processing is therefore ended (213). When the set S' is not an empty set (NO in 206), on the other hand, the SQL flow analyzing module 103 takes one element out of the set S' (mapping from the SQL statement to an SQL operation string) and stores the element in a variable s' (207). The SQL flow analyzing module 103 also stores a set (S-{s'}), which is obtained by removing the element that has been stored in the variable s' from the set S, in a variable S", which represents a set (hereinafter referred to as "set S").

The SQL flow analyzing module 103 then determines whether or not the set S" is an empty set (208). When the set S" is an empty set (YES in 208), the SQL flow analyzing module 103 returns to the processing 206. When the set S" is not an empty set (NO in 208), on the other hand, the SQL flow analyzing module 103 takes one element out of the set S" and stores the element in a variable s" (209). The SQL flow analyzing module 103 then analyzes dependency between the element stored in the variable s' and the element stored in the s" (210). The processing 210 is described later with reference to FIG. 3.

Thereafter, the SQL flow analyzing module 103 determines whether or not there is dependency between the element stored in the variable s' and the element stored in the variable s" (211). When there is no dependency (NO in 211), the SQL flow analyzing module 103 returns to the processing 208 to analyze dependency in relation to another element stored in the set S. When there is dependency (YES in 211), on the other hand, the SQL flow analyzing module 103 registers this combination of the variable s' and the variable s" in the SQL dependency table 113 (212), and returns to the processing 208.

The SQL flow analyzing module 103 can analyze the execution order relation among the SQL commands through the processing 206 to processing 212 described above.

Depending on the accuracy of analysis, values that a variable obtained as a result of the above-described analysis by the AP flow analyzing module 102 can take may be indeterminate. When that is the case, the SQL flow analyzing module 103 can improve analysis accuracy by using the execution result 109 of the target program 108.

Figure 3:
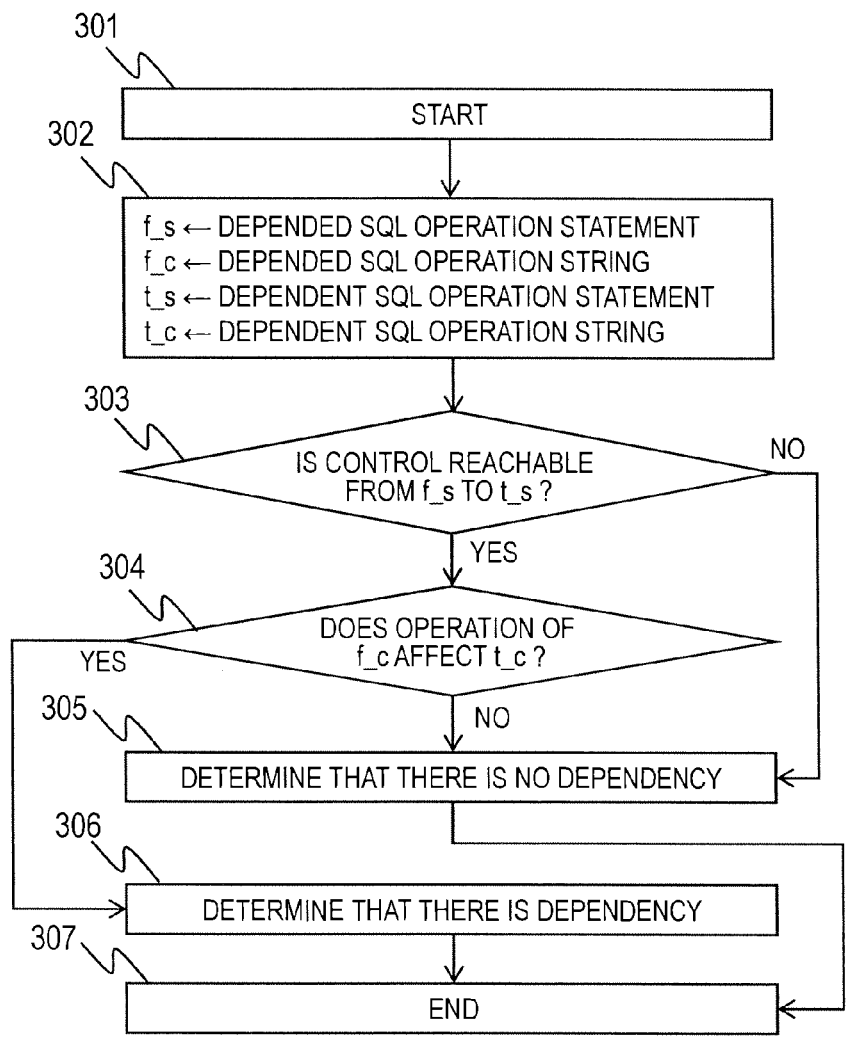
FIG. 3 is a flow chart illustrating control logic of processing of analyzing dependency between two SQL operation statements according to the first embodiment of this invention.

FIG. 3 is a flow chart illustrating control logic of the processing of analyzing dependency between two SQL operation statements according to the first embodiment of this invention. The processing 210 of FIG. 2 is described in detail here.

The SQL flow analyzing module 103 first starts the processing in processing 301 (301). In the next processing 302, the SQL flow analyzing module 103 stores a depended SQL operation statement, a depended SQL operation string, a dependent SQL operation statement, and a dependent SQL operation string in variables f_s, f_c, t_s, and t_c, respectively (302). The depended SQL operation statement and SQL operation string are obtained based on an element that is stored in the variable s' (see the processing 207 of FIG. 2). The dependent SQL operation statement and SQL operation string are obtained based on an element that is stored in the variable s" (see the processing 209 of FIG. 2).

The SQL flow analyzing module 103 then determines whether or not control is reachable from the depended SQL operation statement stored in the variable f_s to the dependent SQL operation statement stored in the variable t_s (303). Whether control is reachable or not can be analyzed by the AP flow analyzing module 102 with a known control flow analysis technology in a compiler or the like.

What is determined in the processing 303 by the SQL flow analyzing module 103 is the execution order of processing by the depended SQL operation statement and processing by the dependent SQL operation statement. Specifically, the SQL flow analyzing module 103 determines that control is reachable when the depended SQL operation statement is about processing that has a possibility of being executed before the dependent SQL operation statement. The SQL flow analyzing module 103 determines that control is not reachable when the depended SQL operation statement is about processing that has no possibility of being executed before the dependent SQL operation statement.

When it is found in the processing 303 that control is not reachable (NO in 303), the SQL flow analyzing module 103 determines that there is no dependency (305) and ends the entire processing (307). When it is found in the processing 303 that control is reachable (YES in 303), on the other hand, the SQL flow analyzing module 103 proceeds to processing 304 to determine whether or not the operation of the SQL operation string stored in the variable f_c affects the execution result of the SQL operation string stored in the variable t_c (304).

What is determined in the processing 304 by the SQL flow analyzing module 103 is whether or not the specifics of the operation of the former SQL operation string affect the specifics of the operation of the latter SQL operation string. Specifically, in the case where the specifics of the operation of the former SQL operation string are "database update" and the specifics of the operation of the latter SQL operation string are "database search", the result of updating a database affects the result of searching the database, and it is therefore determined that the latter SQL operation string is affected. In the case where the specifics of the operation of the former SQL operation string are "database search under a first condition" and the specifics of the operation of the latter SQL operation string are "database search under a second condition", on the other hand, the searches are independent of each other and it is therefore determined that the latter SQL operation string is not affected.

When it is found in the processing 304 that the latter SQL operation string is not affected (NO in 304), the SQL flow analyzing module 103 determines that there is no dependency (305) and ends the entire processing (307). When it is found in the processing 304 that the latter SQL operation string is affected (YES in 304), on the other hand, the SQL flow analyzing module 103 determines that there is dependency (306) and ends the entire processing (307).

The SQL flow analyzing module 103 can analyze dependency between two SQL operation statements through the processing described above.

Figure 4:
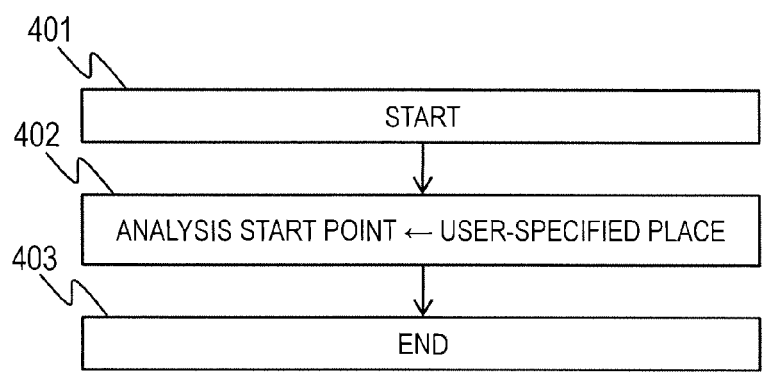
FIG. 4 is a flow chart illustrating control logic of an analysis start point analyzing module according to the first embodiment of this invention.

FIG. 4 is a flow chart illustrating control logic of the analysis start point analyzing module 104 according to the first embodiment of this invention.

The analysis start point analyzing module 104 first starts the processing in processing 401 (401). In the next processing 402, the analysis start point analyzing module 104 sets a spot specified by a user as an analysis start point (the start point of an analysis) (402). Setting an analysis start point is accomplished by a method in which the user points out a spot (statement) in a program where an invalid value has been confirmed, or a method in which the user specifies a spot that has an invalid value out of results displayed on a display. The analysis start point analyzing module 104 then ends the entire processing (403).

The analysis start point analyzing module 104 can set as an analysis start point a spot specified by the user through the processing described above.

Figure 5:
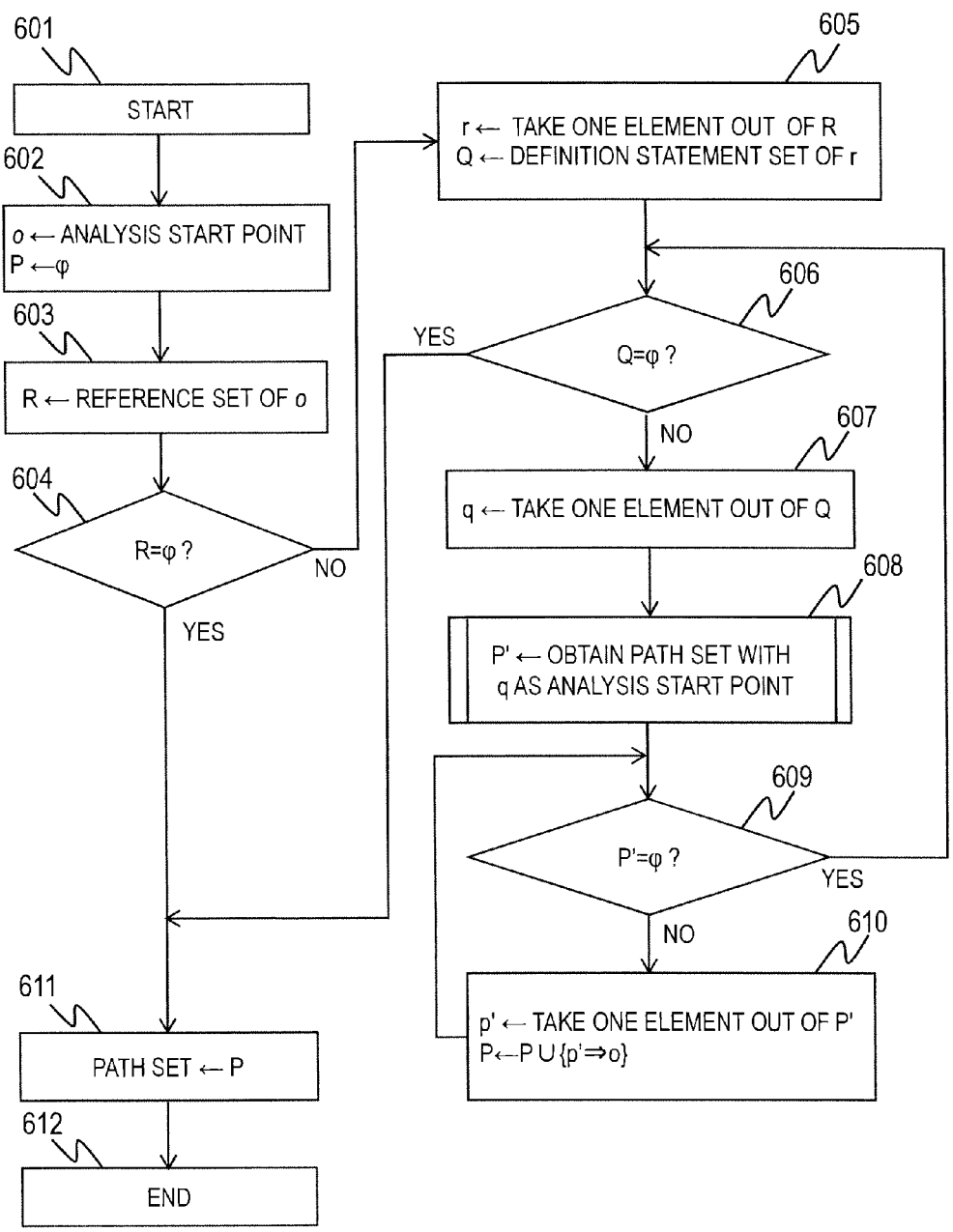
FIG. 5 is a flow chart illustrating control logic of an invalid propagation path analyzing module according to the first embodiment of this invention.

FIG. 5 is a flow chart illustrating control logic of the invalid propagation path analyzing module 105 according to the first embodiment of this invention. The invalid propagation path analyzing module 105 analyzes a propagation route (path) of an invalid calculation result by using, as the start point, an analysis start point that is set by the analysis start point analyzing module 104.

The invalid propagation path analyzing module 105 first starts the processing in processing 601 (601). In the next processing 602, the invalid propagation path analyzing module 105 stores in a variable o an analysis start point statement set by the analysis start point analyzing module 104, and performs initialization by setting up a variable P, which represents a set of paths (hereinafter referred to as "path set P"), as an empty set (602).

The invalid propagation path analyzing module 105 then stores a variable referred to in the analysis start point statement that has been stored in the variable o and a set of memory locations in a variable R which represents a reference set (hereinafter referred to as "reference set R") (603).

Thereafter, the invalid propagation path analyzing module 105 determines whether or not the reference set R is an empty set (604). When the reference set R is an empty set (YES in 604), the invalid propagation path analyzing module 105 proceeds to processing 611 to set the path set P as a path set of invalid propagation routes (611), and ends the entire processing (612).

When it is found in the processing 604 that the reference set R is not an empty set (NO in 604), on the other hand, the invalid propagation path analyzing module 105 proceeds to processing 605 to take one element out of the reference set R and store the element in a variable r (605). The processing 605 also includes storing a set of definition statements of the variable r in a variable Q which represents a set of definition statements (hereinafter referred to as "definition statement set Q"). A definition statement of the variable r means a statement for calculating a value that the variable r holds. Processing of obtaining a definition statement set is carried out by the AP flow analyzing module 102 with a known control flow analysis technology in a compiler or the like.

The invalid propagation path analyzing module 105 then determines whether or not the definition statement set Q is an empty set (606). When the definition statement set Q is an empty set (YES in 600), the invalid propagation path analyzing module 105 proceeds to the processing 611 to set the path set P as a path set of invalid propagation routes (611), and ends the entire processing (612).

When it is found in the processing 606 that the definition statement set Q is not an empty set (NO in 606), the invalid propagation path analyzing module 105 proceeds to processing 607 to take one element (definition statement) out of the definition statement set Q and stores the element in a variable q (607). The invalid propagation path analyzing module 105 then obtains a path set having the element that has been stored in the variable q as an analysis start point by recursively calling the series of steps of invalid propagation path analysis control logic of FIG. 5, and stores the obtained path set in a variable P' which represents a path set (hereinafter referred to as "path set P'") (608).

The invalid propagation path analyzing module 105 proceeds to processing 609 to determine whether or not the path set P' is an empty set (609). When the path set P' is an empty set (YES in 609), the invalid propagation path analyzing module 105 returns to the processing 606. When the path set P' is not an empty set (NO in 609), on the other hand, the invalid propagation path analyzing module 105 proceeds to processing 610 to take one element (path) out of the path set P' and stores the element in a variable p' (610). The processing 610 also includes adding, to the set P, a path (p'$\Rightarrow$ o), which is obtained by adding, to the path that has been stored in the variable p', a transition from the end of this path to the analysis start point stored in the variable o. Specifically, when the path that has been stored in p' is $n^o \Rightarrow \ldots \Rightarrow n^m$, a new path $n^o \Rightarrow \ldots \Rightarrow n^m \Rightarrow o$ is created and added to the set P. The invalid propagation path analyzing module 105 then returns to the processing 609.

Through the processing described above, the invalid propagation path analyzing module 105 analyzes data propagation routes by using as the start point an analysis start point set by the analysis start point analyzing module 104 and by following the control flow of the target program 108 backwards. The invalid propagation path analyzing module 105 can thus obtain a path set indicating execution routes of statements that are candidates for the cause of an invalid calculation result.

Figure 6:
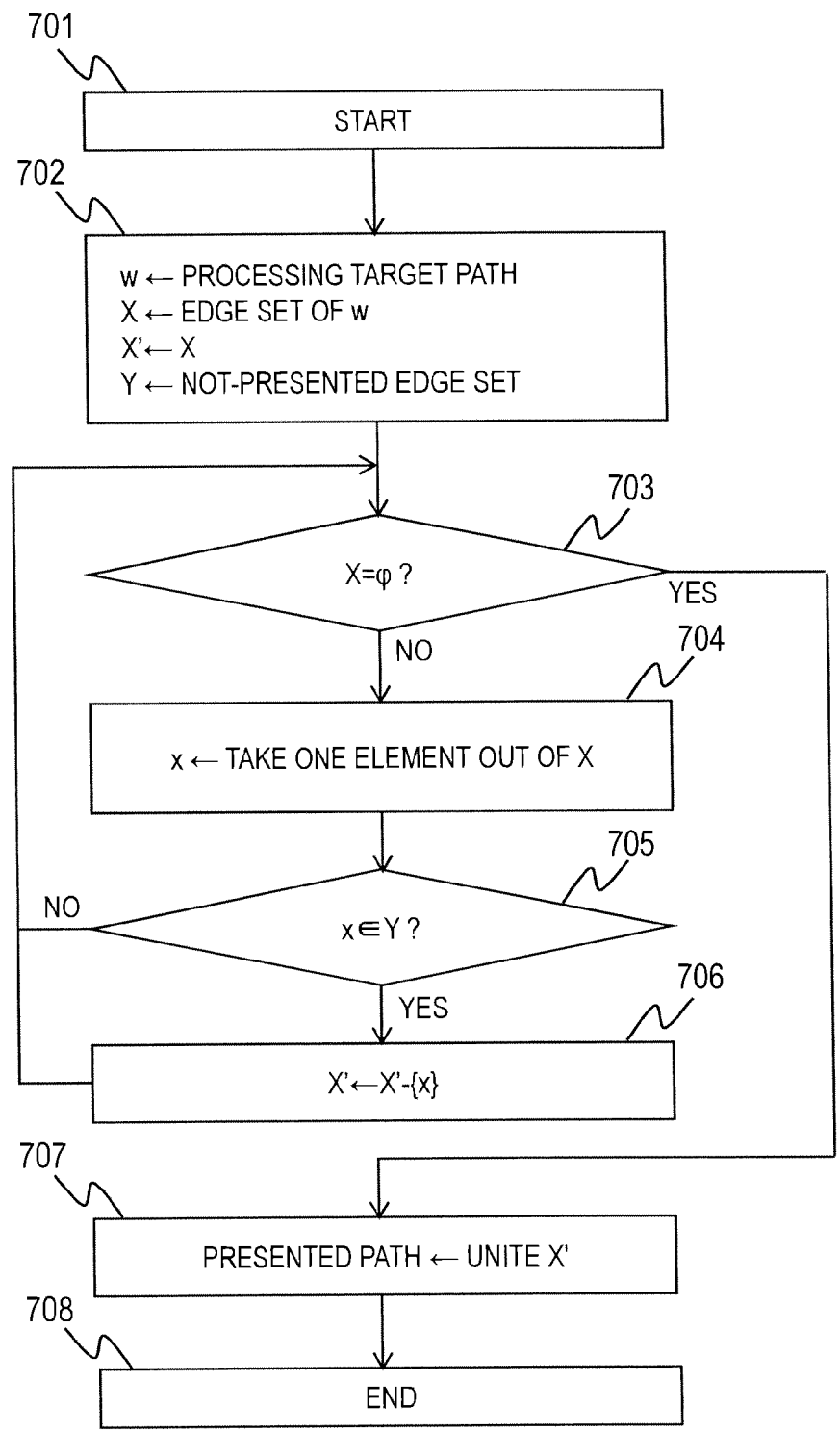
FIG. 6 is a flow chart illustrating control logic of an origin narrowing module according to the first embodiment of this invention.

FIG. 6 is a flow chart illustrating control logic of the origin narrowing module 106 according to the first embodiment of this invention. The origin narrowing module 106 narrows down the origin (the spot of the cause) by removing spots that are less likely to be or that are not the cause of program malfunction from propagation routes (a path set) obtained by the invalid propagation path analyzing module 105.

The origin narrowing module 106 first starts the processing in processing 701 (701). In the next processing 702, the origin narrowing module 106 stores a processing target path (propagation route) obtained by the invalid propagation path analyzing module 105 in a variable w (702). The processing 702 also includes storing, in variables X and X' (hereinafter referred to as "transition edge sets X and X"), a set of edges that transit along the path that has been stored in the variable w (a set of transitions from a predetermined sentence to sentences to be executed subsequently), and storing, in a variable Y, a not-presented edge set (a set of edges that are not to be presented to the user) which is set in advance by the user or others (hereinafter referred to as not-presented edge set Y").

The origin narrowing module 106 then determines whether or not the transition edge set X is an empty set (703). When the transition edge set X is an empty set (YES in 703), the origin narrowing module 106 proceeds to processing 707 to set, as a presented path (a path to be presented to the user), a path obtained by uniting the transition edge set X' (707), and ends the entire processing (708).

When it is found in the processing 703 that the transition edge set X is not an empty set (NO in 703), on the other hand, the origin narrowing module 106 proceeds to processing 704 to take one element (edge) out of the transition edge set X and store the element in a variable x (704). The origin narrowing module 106 then determines whether or not the edge that has been stored in the variable x is included in the not-presented edge set Y (705).

In the case where the edge is not included in the non-presented edge set Y (NO in 705), the origin narrowing module 106 returns to the processing 703 to repeat the processing for the next edge. When it is found in the processing 705 that the edge is included in the non-presented edge set Y (YES in 705), on the other hand, the origin narrowing module 106 proceeds to processing 706 to set up as the set X' a set (X'-{x}), which is obtained by removing the edge stored in the variable x from the set X' (706). The origin narrowing module 106 then returns to the processing 703 to repeat the processing for the next edge.

Through the processing described above, the origin narrowing module 106 determines for each element (edge) of the transition edge set X whether or not the element is included in the not-presented edge set Y, and sets, as a presented path, a path obtained by uniting elements that are not included in the not-presented edge set Y. Edges included in a not-presented edge set can thus be removed from processing target paths.

Figure 7:
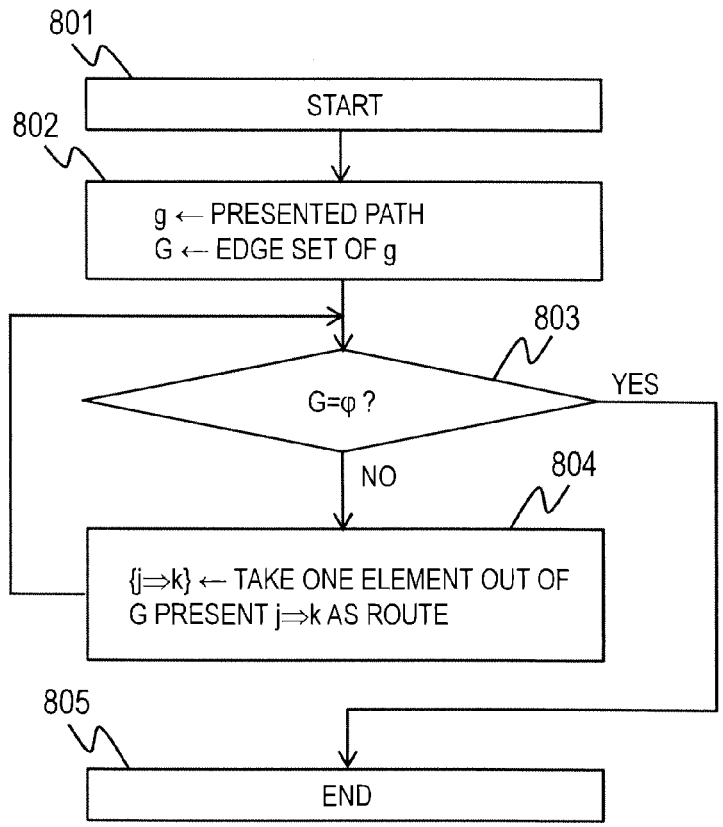
FIG. 7 is a flow chart illustrating control logic of a route mapping module according to the first embodiment of this invention.

FIG. 7 is a flow chart illustrating control logic of the route mapping module 107 according to the first embodiment of this invention. The route mapping module 107 executes processing of presenting to the user a presented path which is obtained by the origin narrowing module 106.

The route mapping module 107 first starts the processing in processing 801 (801). In the next processing 802, the route mapping module 107 stores a presented path which is obtained by the origin narrowing module 106 in a variable g (802). The processing 802 also includes storing, in a variable G (hereinafter referred to as "edge set G"), an edge set of the presented path that has been stored in the variable g.

The route mapping module 107 then determines whether or not the edge set G is an empty set (803). When the edge set G is an empty set (YES in 803), the route mapping module 107 ends the entire processing (805). When it is found in the processing 803 that the edge set G is not an empty set (NO in 803), on the other hand, the route mapping module 107 proceeds to processing 804 to take one element (edge) out of the edge set G, and store a transition source statement and a transition destination statement in a variable j and a variable k, respectively (804). The processing 804 also includes presenting a transition from the transition source statement to the transition destination statement as a route. The route mapping module 107 then returns to the processing 803 to repeat the processing.

The route mapping module 107 presents a presented path which is obtained by the origin narrowing module 106 to the user through the processing described above.

A concrete example of the first embodiment of this invention is described below.

Figure 8:
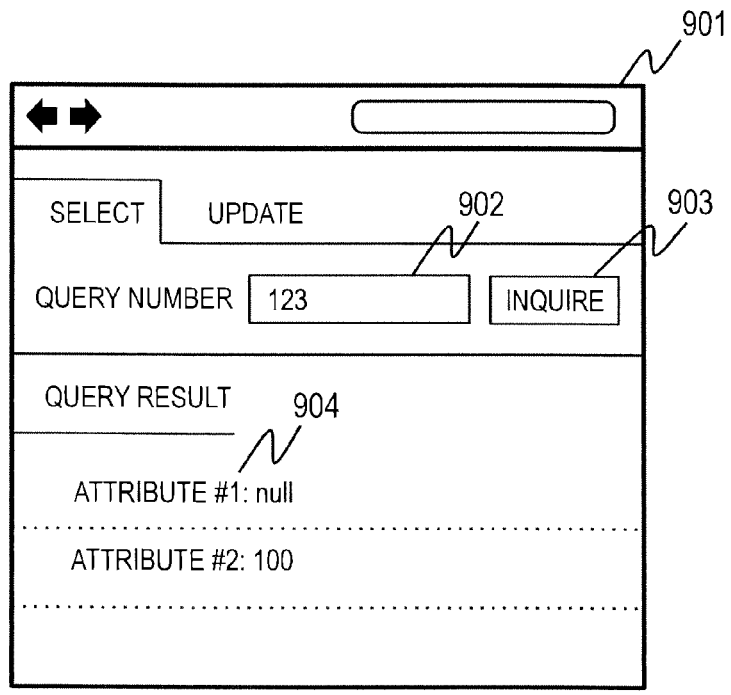
FIG. 8 is an example of a user interface in a user terminal according to a concrete example of the first embodiment of this invention.

FIG. 8 is an example of a user interface in the user terminal 110 according to the concrete example of the first embodiment of this invention. A Web interface 901 illustrated in FIG. 8 is displayed on a display of the user terminal 110. The Web interface 901 is created based on the execution result 109 of FIG. 1.

The Web interface 901 includes a query number input form 902 for inputting a query number, an "inquire" button 903 for making an inquiry about the input query number, and a query result 904 obtained as a result of the inquiry about the input query number.

In the example of FIG. 8, a query result for an "attribute #1" is "null". That the query result of the "attribute #1" has an invalid value such as "null" is treated as an indicator of program malfunction.

FIG. 9 is a diagram illustrating the target program 108 according to the concrete example of the first embodiment of this invention. The target program illustrated in FIG. 9 which is denoted by 1001 is a logic layer program as an example of the target program 108. The target program 1001 realizes a single service.

In the example of FIG. 9, a method doPost is called by a user action. When the method doPost is called, a method C0.m0 (statement (g)) and a method C0.m1 (statement (h)) in the method doPost are called in order.

When the method C0.m0 (statement (g)) is called, an invalid value is first stored in a variable v0 in a statement (a). Next, in a statement (b), the invalid value v0 is used to generate an SQL operation string s0, which indicates an SQL update statement. Thereafter, SQL update is executed in a statement (c). The invalid value is stored in a processing target database of the target program 1001 as a result.

When the method C0.m1 (statement (h)) is called, an SQL operation string s1 which indicates an SQL select statement is first generated in a statement (d). Next, in a statement (e), SQL query is executed. In the statement (e), the invalid value stored in the database by the statement (c) described above is extracted as a query result. Thereafter, the extracted query result (invalid value) is output in a statement (f). In short, the query result 804 of FIG. 8 is a display example of an invalid value that is output by executing the statement (f).

FIG. 10 is a diagram illustrating a result of an analysis performed by the AP flow analyzing module 102 on the target program 1001 according to the concrete example of the first embodiment of this invention.

An analysis result table 1303 illustrated in FIG. 10 includes an execution route column 1301 and a variable column 1302. The execution route column 1301 indicates the control flow of the target program 1001 of FIG. 9 ((g)→(a)→(b)→(c)→(h)→(d)→(e)→(f)). The variable column 1302 includes a statement column 1304 which indicates the statements (a) to (f) of the target program 1001, a variable name column 1305 which indicates for each of the statements (a) to (f) a variable in the statement, and a value column 1306 which indicates the value of the variable.

FIG. 11 is a diagram illustrating an example of a table 1501 which is used by the SQL flow analyzing module 103 to analyze dependency between two SQL operation statements according to the concrete example of the first embodiment of this invention.

The table 1501 of FIG. 11 is used when the SQL flow analyzing module 103 analyzes dependency between two SQL operation statements in Step 304 of FIG. 3.

In this case, two SQL operation statements to be analyzed are called preceding operation and subsequent operation based on the order of execution. In the case where the preceding operation is "update" and the preceding operation and the subsequent operation are to process the same database, the subsequent operation is dependent on the result of the preceding operation. In other words, there is dependency between the preceding operation and the subsequent operation. In the case where the preceding operation is "select", on the other hand, there is no dependency between the preceding operation and the subsequent operation.

Described above is the premise of a description on an operation in which the SQL flow analyzing module 103 executes the control logic of FIG. 2 in accordance with the target program 1001 of FIG. 9. SQL operation strings corresponding to the SQL operation statements (c) and (e) in the target program 1001 of FIG. 9 are "update T set item=<invalid value>" and "select * from T . . . ", respectively.

The SQL flow analyzing module 103 obtains S={(c)→"update T set item=<invalid value>", (e)→"select * from T . . . "} through the processing 202 to processing 204 of FIG. 2. The SQL flow analyzing module 103 then analyzes dependency for each of combinations (c)⇒(e) and (e)⇒(c) through the processing 210. Control is not reachable in (e)⇒(c) (NO in the processing 303 of FIG. 3) and, consequently, there is no dependency in (e)⇒(c) (305). In (c)⇒(e), on the other hand, there is dependency (306) because control is reachable (YES in the processing 303 of FIG. 3) and the preceding operation (c) is "update" and the subsequent operation (e) is "select" (YES in 304). The SQL flow analyzing module 103 determines as a result that there is dependency in (c)⇒(e).

When the user specifies on the display screen of FIG. 8 that the query result of the "attribute #1" is an invalid value, the analysis start point analyzing module 104 sets the specified spot (i.e., the statement (f) of FIG. 9) as an analysis start point.

The invalid propagation path analyzing module 105 analyzes a propagation route of the invalid calculation result by executing the control logic of FIG. 5 and using as the analysis start point the statement (f) of FIG. 9 which has been set by the analysis start point analyzing module 104.

Through the processing 602 of FIG. 5, the invalid propagation path analyzing module 105 first stores the analysis start point statement (f) in the variable o and performs initialization by setting up the path set P as an empty set (602). The invalid propagation path analyzing module 105 then stores in the reference set R a variable v1, which is referred to in the analysis start point statement (f) stored in the variable o (603). The invalid propagation path analyzing module 105 then determines whether or not the reference set R is an empty set (604). Because the reference set R is not an empty set (NO in 604), the invalid propagation path analyzing module 105 proceeds to the processing 605 to take one element (the variable v1) out of the reference set R and store the element in the variable r (605). In the processing 605, the invalid propagation path analyzing module 105 also stores, in the definition statement set Q, the statement (e) which is a definition statement of the variable v1 stored in the variable r. The invalid propagation path analyzing module 105 then determines whether or not the definition statement set Q is an empty set (606). Because the definition statement set Q is not an empty set (NO in 606), the invalid propagation path analyzing module 105 proceeds to the processing 607 to take one element (the statement (e)) out of the definition statement set Q and store the element in the variable q (607). Thereafter, the series of steps of invalid propagation path analysis control logic of FIG. 5 is called recursively, to thereby obtain a path set that has the statement (e) stored in the variable q as the analysis start point, and the obtained path set is stored in the path set P' (608). The invalid propagation path analyzing module 105 then determines whether or not the path set P' is an empty set (609). Because the path set P' is not an empty set (NO in 609), the invalid propagation path analyzing module 105 proceeds to the processing 610 to take one element (path) out of the path set P' and store the element in the variable p' (610). In the processing 610, the invalid propagation path analyzing module 105 also adds, to the set P, a path ((e)⇒ (f)), which is obtained by adding to the path stored in the variable p' a transition from the end (statement (e)) of this path to the analysis start point (statement (f)) stored in the variable o. The invalid propagation path analyzing module 105 then returns to the processing 609, where the path set P' is found to be an empty set (YES in 609), and therefore returns to the processing 606. The invalid propagation path analyzing module 105 finds out that the definition statement set Q is an empty set (YES in 606), accordingly proceeds to the processing 611 to set the path set P as a path set of invalid propagation routes (611), and ends the entire processing (612).

Through the processing described above, the invalid propagation path analyzing module 105 analyzes data propagation routes by using as the start point an analysis start point set by the analysis start point analyzing module 104 (the statement (f)) and by following the control flow of the target program 108 backwards. The invalid propagation path analyzing module 105 can thus obtain a path set indicating execution routes of statements that are candidates for the cause of an invalid calculation result. The data propagation routes obtained as a result of the analysis are illustrated in FIG. 12.

FIG. 12 is a diagram illustrating path sets that are obtained by the invalid propagation path analyzing module 105 according to the concrete example of the first embodiment of this invention. As illustrated in FIG. 12, {(h)⇒ (d)⇒ (e) ⇒ (f), (g)⇒ (b)⇒ (c)⇒ (e)⇒ (f), (a)⇒ (b)⇒ (c)⇒ (e) ⇒ (f)} is obtained as a path set 1804 that has the statement (f) as an analysis start point 1801.

The origin narrowing module 106 narrows down the origin (the spot of the cause) by removing spots that are less likely to be or that are not the cause of program malfunction from propagation routes obtained by the invalid propagation path analyzing module 105.

Through the processing 702 of FIG. 6, the origin narrowing module 106 first stores a processing target path (for example, (h)⇒ (d)⇒ (e)⇒ (f)) in the variable w (702). In the processing 702, the origin narrowing module 106 also stores a set of edges that transit along the path that has been stored in the variable w, ({(h)⇒ (d), (d)⇒ (e), (e)⇒ (f)}), in the transition edge sets X and X', and stores a not-presented edge set in the not-presented edge set Y.

FIG. 13 is a diagram illustrating an example of the not-presented edge set according to the concrete example of the first embodiment of this invention. As illustrated in FIG. 13, edges 1902 respectively associated with item numbers 1901 are registered as the not-presented edge set. The not-presented edge set in the example of FIG. 13 is ({(h)⇒ (d), (d) ⇒ (e)}).

The origin narrowing module 106 then determines whether or not the transition edge set X is an empty set (703). Because the transition edge set X is not an empty set (NO in 703), the origin narrowing module 106 proceeds to the processing 704 to take one element (for example, (h)⇒ (d)) and store the element in the variable x (704). The origin narrowing module 106 then determines whether or not the edge ((h)⇒ (d)) stored in the variable x is included in the not-presented edge set Y (705). Because the edge ((h)⇒ (d)) is included in the not-presented edge set Y (YES in 705), the origin narrowing module 106 proceeds to the processing 706 to set up as the transition edge set X' a set that is obtained by removing the edge ((h)⇒ (d)) stored in the variable x from the transition edge set X ({(h)⇒ (d), (d)⇒ (e), (e)⇒ (f)}) (706). Thereafter, the origin narrowing module 106 returns to the processing 703 to repeat the processing for the next edge.

After the processing 703 to the processing 706 are repeated, only ((e)⇒ (f)) is left in the transition edge set X. The origin narrowing module 106 then returns to the processing 703 to find out that the transition edge set X is an empty set (YES in 703). The origin narrowing module 106 accordingly proceeds to the processing 707, where the origin narrowing module 106 sets, as a presented path, a path ((e)⇒ (f)) which is obtained by uniting the transition edge set X' (707), and ends the entire processing.

The origin narrowing module 106 executes the same analyzing processing for processing target paths {(g)⇒ (b)⇒ (c) ⇒ (e)⇒ (f), (a)⇒ (b)⇒ (c)⇒ (e)⇒ (f)}. These processing target paths do not include an edge registered in the not-presented edge set Y (see FIG. 13), and the entirety of the processing target paths is set as a presented path.

Through the processing described above, the origin narrowing module 106 can set presented paths {(e)⇒ (f), (g) ⇒ (b)⇒ (c)⇒ (e)⇒ (f), (a)⇒ (b)⇒ (c)⇒ (e)⇒ (f)} which are obtained by removing, from processing target paths {(h) ⇒ (d)⇒ (e)⇒ (f), (g)⇒ (b)⇒ (c)⇒ (e)⇒ (f), (a)⇒ (b) ⇒ (c)⇒ (e)⇒ (f)}, edges ({(h)⇒ (d), (d)⇒ (e)}) which are included in the not-presented edge set Y. In short, pieces of candidate data presented to the user can be limited in number by removing edges that are included in the not-presented edge set from processing target paths.

The route mapping module 107 executes processing of presenting a presented path which is obtained by the origin narrowing module 106 to the user.

Through the processing 802 of FIG. 7, the route mapping module 107 first stores, in the variable g, a processing target path (for example, (g)⇒ (b)⇒ (c)⇒ (e)⇒ (f)) out of presented paths which are obtained by the origin narrowing module 106 (802). In the processing 802, the route mapping module 107 also stores, in the edge set G, ((g)⇒ (b), (b) ⇒ (c), (c)⇒ (e), (e)⇒ (f)) which is an edge set of the presented path that has been stored in the variable g.

The route mapping module 107 then determines whether or not the edge set G is an empty set (803). Because the edge set G is not an empty set (NO in 803), the route mapping module 107 proceeds to the processing 804 to take one element (for example, (g)⇒ (b)) out of the edge set G, and store the transition source statement (g) and the transition destination statement (b) in the variable j and the variable k, respectively (804). In the processing 804, the route mapping module 107 also presents a transition from the transition source statement (g) to the transition destination statement (b) as a route. The route mapping module 107 then returns to the processing 803 to repeat the processing for the next element.

The route mapping module 107 executes the same mapping processing for processing target paths {(e)⇒ (f), (a)⇒ (b) ⇒ (c)⇒ (e)⇒ (f)}.

The route mapping module 107 presents a presented path which is obtained by the origin narrowing module 106 to the user through the processing described above.

Figure 14:
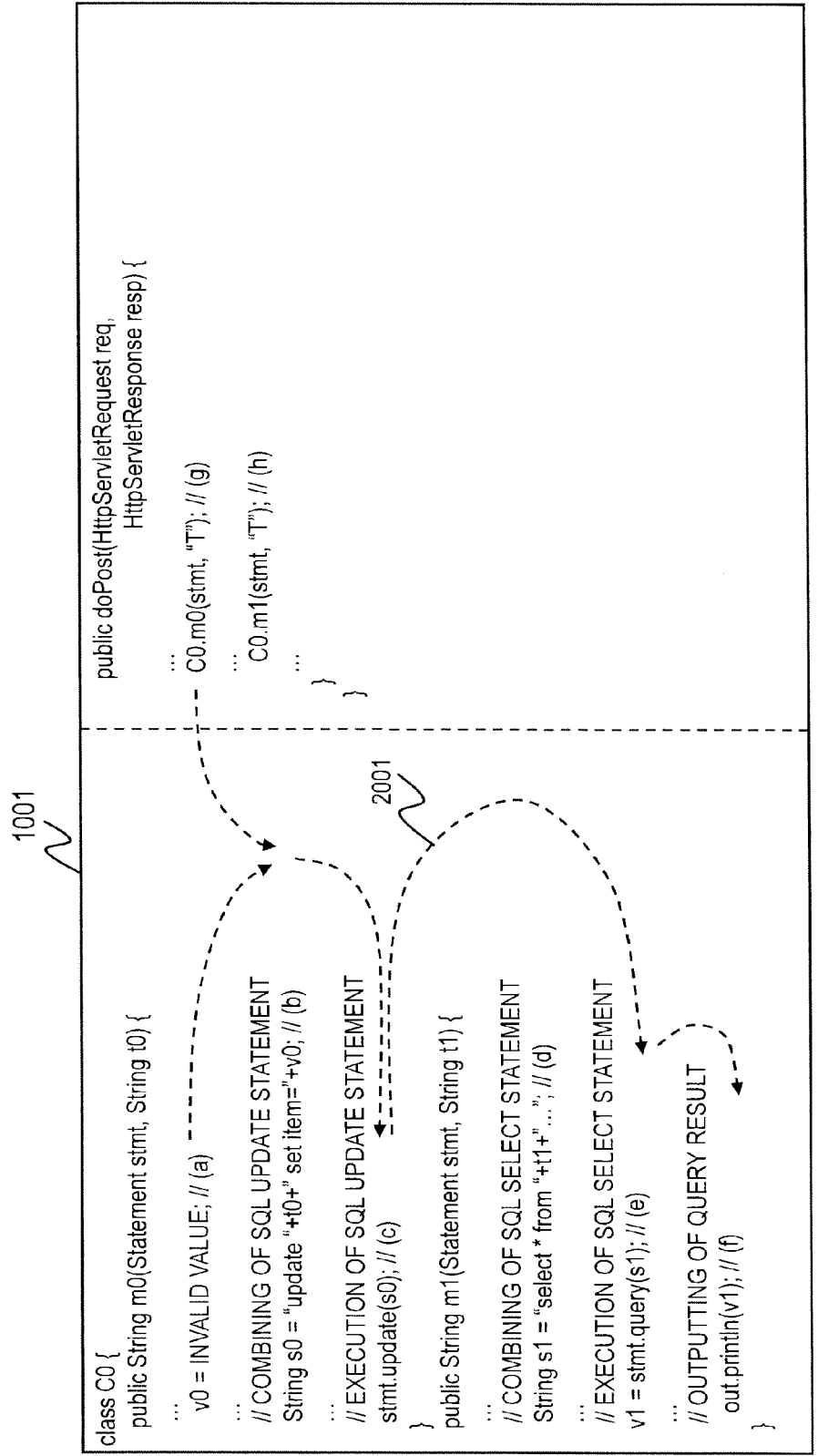
FIG. 14 is a diagram illustrating an example of displaying a presented path according to the concrete example of the first embodiment of this invention.

FIG. 14 is a diagram illustrating an example of displaying a presented path 2001 according to the concrete example of the first embodiment of this invention. As illustrated in FIG. 14, the presented path 2001 which is indicated by the dashed line is presented in association with the target program 1001.

According to the first embodiment of this invention described above, the spot of the cause of program malfunction, program vulnerability, or the like can be identified with ease in a 3-tier architecture Web application. Specifically, the statement (f) which is where program malfunction has occurred is used as an analysis start point to analyze a path to the statement (a) which is the spot of the cause of the malfunction by following the path backwards, and the path is presented to the user as illustrated in FIG. 14. This enables the user to easily identify the spot of the cause of program malfunction based on the spot where the malfunction has occurred.

(Second Embodiment)

A second embodiment of this invention is described next.

The first embodiment described above deals with a case where the target program 108 (see FIG. 1) is constituted of a single service as is the case for the target program 1001 of FIG. 9. Described here is a case where the target program 108 is constituted of a plurality of services as is the case for a target program 1101 of FIG. 15. Of the configuration of the analysis system 100 and the respective operations of the modules 102 to 107 of the analysis system 100 of the second embodiment, descriptions on the configuration and the operations that are the same as in the first embodiment described above are omitted as appropriate.

FIG. 15 is a diagram illustrating the target program 108 according to a concrete example of the second embodiment of this invention. The target program illustrated in FIG. 15 which is denoted by 1101 is a logic layer program as an example of the target program 108. The target program 1101 realizes a plurality of services.

In the example of FIG. 15, classes C0 and C1 are programs that realize services different from each other. A method doPost of the class C0 and a method doPost of the class C1 are each called by a request from the user.

When the method doPost of the class C0 is called, a method C0.m0 (statement (d)) is called. When the method C0.m0 (statement (d)) is called, an invalid value is first stored in a variable v0 in a statement (a). Next, in a statement (b), the invalid value v0 is used to generate an SQL operation string s0 which indicates an SQL update statement. Thereafter, SQL update is executed in a statement (c). The invalid value is stored in a processing target database of the target program 1101 as a result.

When the method doPost of the class C1 is called, on the other hand, a method C1.m1 (statement (h)) is called. When the method C1.m1 (statement (h)) is called, an SQL operation string s1 which indicates an SQL select statement is first generated in a statement (e). Next, in a statement (f), SQL query is executed. In the statement (f), the invalid value stored in the database by the statement (c) described above is extracted as a query result. Thereafter, the extracted query result (invalid value) is output in a statement (g).

In a program as this, the order of executing the method doPost of the class C0 and the method doPost of the class C1 is unclear. The AP flow analyzing module 102 therefore clarifies the execution order of the classes C0 and C1 by executing processing of FIG. 16 based on the execution result 109.

Figure 16:
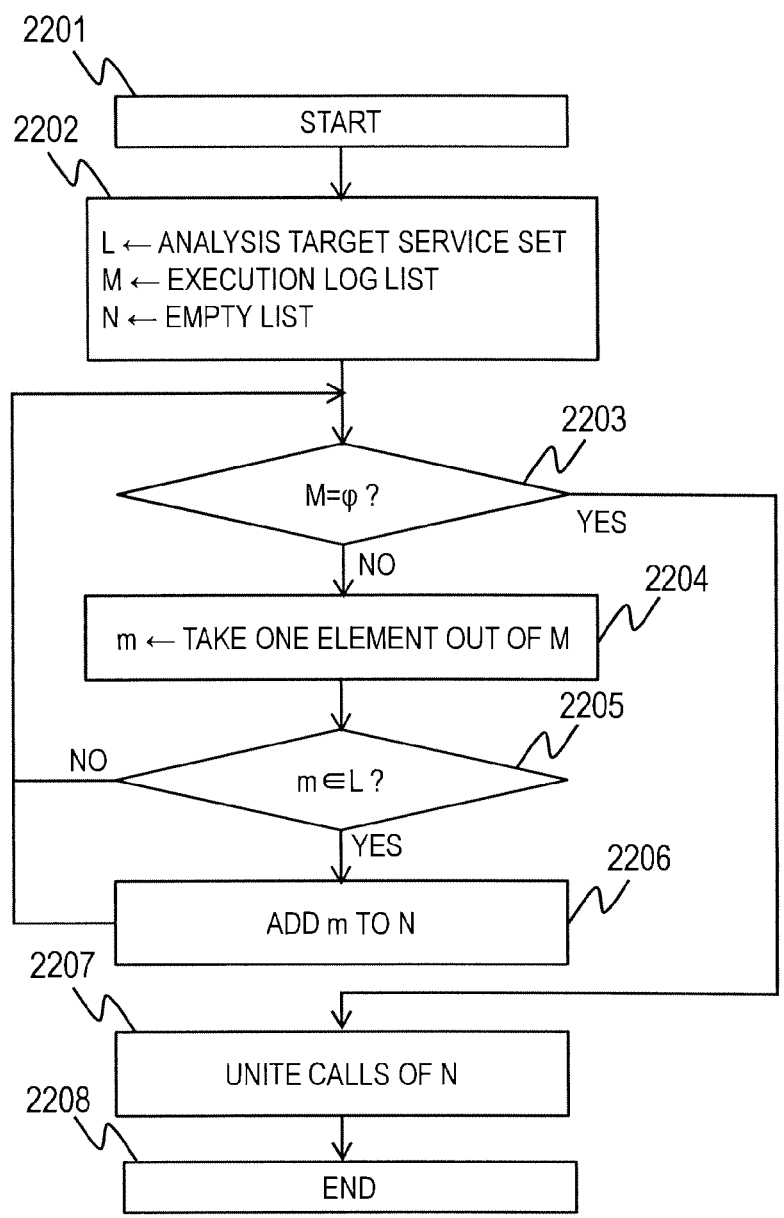
FIG. 16 is a flow chart illustrating control logic for combining a plurality of services according to the second embodiment of this invention.

FIG. 16 is a flow chart illustrating control logic for combining a plurality of services according to the second embodiment of this invention.

The AP flow analyzing module 102 first starts processing in processing 2201 (2201). In the next processing 2202, the AP flow analyzing module 102 stores an analysis target service set in a variable L (hereinafter referred to as "analysis target service set L") (2202). The processing 2202 also includes storing an execution log list in a variable M (hereinafter referred to as "execution log set M"), and performing initialization by setting up a variable N for combining a plurality of services (hereinafter referred to as "analysis target service list N") as an empty list. The execution log list is described with reference to FIG. 17.

FIG. 17 is a diagram illustrating an example of the execution log list according to the concrete example of the second embodiment of this invention. The execution log list includes a time column 1201 for storing a time at which an event has been executed, and an event column 1202 for storing the specifics of the event. The AP flow analyzing module 102 uses this execution log list to execute processing 2203 to processing 2207 described below, thereby checking the order in which a plurality of services have been called.

In processing 2203, the AP flow analyzing module 102 determines whether or not the execution log set M is an empty set (2203). When the execution log set M is an empty set (YES in 2203), the AP flow analyzing module 102 proceeds to processing 2207 to unite calls of the execution log set M (2207), and ends the entire processing (2208).

When it is found in the processing 2203 that the execution log set M is not an empty set (NO in 2203), on the other hand, the AP flow analyzing module 102 proceeds to processing 2204 to take one element (execution log) out of the execution log set M and store the element in a variable m (2204). The AP flow analyzing module 102 then determines whether or not the element that has been stored in the variable m is included in the analysis target service set L (2205).

When the element is not included in the analysis target service set L (NO in 2205), the AP flow analyzing module 102 returns to the processing 2203 to repeat the processing for the next element. When it is found in the processing 2205 that the element is included in the analysis target service set L (YES in 2205), on the other hand, the AP flow analyzing module 102 proceeds to processing 2206 to add the element (execution log) stored in the variable m to the analysis target service list N (2206). The AP flow analyzing module 102 then returns to the processing 2206 to repeat the processing for the next element.

Through the processing described above, the AP flow analyzing module 102 analyzes a plurality of services by referring to an execution log (a service call log of each of the plurality of services) and combining and analyzing a call relation. This processing may be executed by other modules than the AP flow analyzing module 102.

The concrete example of the second embodiment of this invention is described below.

Through the processing 2202 of FIG. 16, the AP flow analyzing module 102 first stores an analysis target service set (the method doPost of the class C0 and the method doPost of the class C1 in FIG. 15) in the analysis target service set L (2202). In the processing 2202, the AP flow analyzing module 102 also stores execution log lists (the table of FIG. 17) in the execution log set M and performs initialization by setting up the analysis target service list N as an empty set.

The AP flow analyzing module 102 then determines whether or not the execution log set M is an empty set (2203). Because the execution log set M is not an empty set (NO in 2203), the AP flow analyzing module 102 proceeds to the step 2204 to take one element (for example, C0.doPost) out of the execution log set M and store the element in the variable m (2204). The AP flow analyzing module 102 then determines whether or not the element that has been stored in the variable m is included in the analysis target service set L (2205).

Because the element (C0.doPost) is included in the analysis target service set L (YES in 2205), the AP flow analyzing module 102 proceeds to the processing 2206 to add the element (C0.doPost) stored in the variable m to the analysis target service list N (2206). The AP flow analyzing module 102 then returns to the processing 2206 to repeat the processing for the next element.

The AP flow analyzing module 102 can obtain the analysis target service list N ([C0.doPost, C1.doPost]) through the processing described above. A temporary call program 2101 illustrated in FIG. 18 can also be created by uniting calls of this analysis target service list N through the processing 2207.

FIG. 18 is a diagram illustrating the temporary call program 2101 according to the concrete example of the second embodiment of this invention. The temporary call program 2101 is a program that gives a place in order for each entry of call processing on the analysis target service list N.

Figures 19, 20:
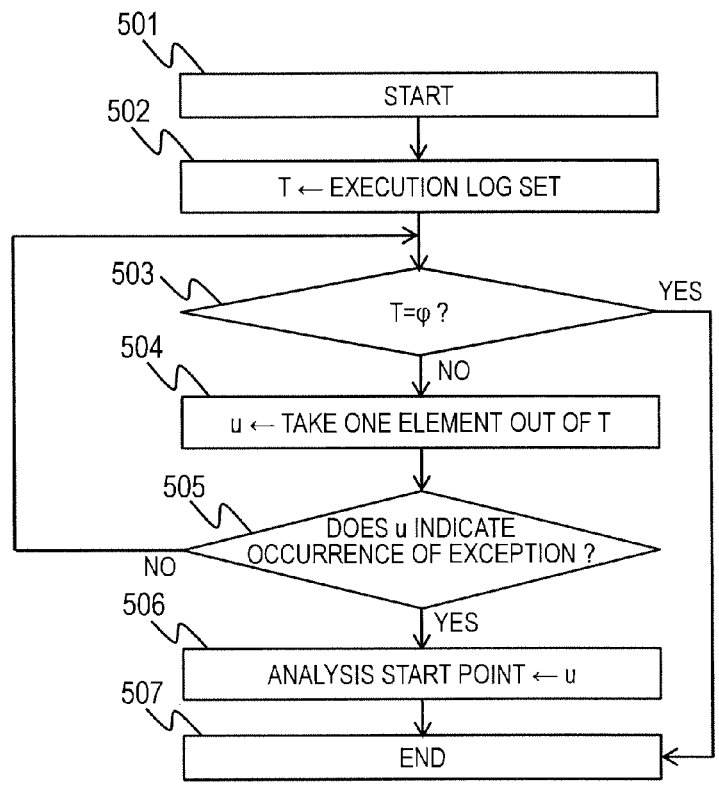
FIG. 19 is a diagram illustrating a result of an analysis performed by an AP flow analyzing module on the target program according to the concrete example of the second embodiment of this invention.
FIG. 20 is a flow chart illustrating control logic of an analysis start point analyzing module according to a third embodiment of this invention.

The AP flow analyzing module 102 executes the analysis described above for the target program 1101 of FIG. 15 and the temporary call program 2101 of FIG. 18, to thereby obtain an analysis result illustrated in FIG. 19.

FIG. 19 is a diagram illustrating the result of an analysis performed by the AP flow analyzing module 102 on the target program 1101 according to the concrete example of the second embodiment of this invention.

An analysis result table 1403 illustrated in FIG. 19 includes an execution route column 1401 and a variable column 1402. The execution route column 1401 indicates the control flow of the target program 1101 of FIG. 15 and the temporary call program 2101 of FIG. 18 ((i)→(d)→(a)→(b) (c)→(j)→(h)→(e)→(f)→(g)). The variable column 1402 includes a statement column 1404 which indicates the statements (a) to (g) of the target program 1101, a variable name column 1405 which indicates for each of the statements (a) to (g) a variable in the statement, and a value column 1406 which indicates the value of the variable.

According to the second embodiment of this invention described above, even in a case where a program is constituted of a plurality of services, the spot of the cause of program malfunction, program vulnerability, or the like can be identified with ease in a 3-tier architecture Web application. Specifically, the statement (g) which is where program malfunction has occurred is used as an analysis start point to analyze a path to the statement (a) which is the spot of the cause of the malfunction by following the path backwards, and the path is presented to the user. This enables the user to easily identify the spot of the cause of program malfunction based on the spot where the malfunction has occurred.

(Third Embodiment)

A third embodiment of this invention is described next.

The first embodiment described above deals with a case where the analysis start point analyzing module 104 sets as an analysis start point a spot specified by the user (see FIG. 4). Described here is a case where the analysis start point analyzing module 104 sets as an analysis start point a spot where exception processing has occurred during the execution of a program. Of the configuration of the analysis system 101 and the respective operations of the modules 102 to 107 of the analysis system 101 of the third embodiment, descriptions on the configuration and the operations that are the same as in the first embodiment described above are omitted as appropriate.

FIG. 20 is a flow chart illustrating control logic of the analysis start point analyzing module 104 according to the third embodiment of this invention.

The analysis start point analyzing module 104 first starts the processing in processing 501 (501). In the next processing 502, the analysis start point analyzing module 104 stores a set of program execution logs in a variable T (hereinafter referred to as "execution log set T") (502). The program execution log set is described later with reference to FIG. 21.

The analysis start point analyzing module 104 then determines whether or not the execution log set T is an empty set (503). When the execution log set T is an empty set (YES in 503), the entire processing is ended (507). When the execution log set T is not an empty set (NO in 503), on the other hand, the analysis start point analyzing module 104 proceeds to processing 504 to take one element (execution log) out of the execution log set T and store the element in a variable u (504).

The analysis start point analyzing module 104 then determines whether or not the element that has been stored in the variable u is an entry indicating the occurrence of an exception (505). When the element stored in the variable u is an entry indicating the occurrence of an exception (YES in 505), the analysis start point analyzing module 104 proceeds to processing 506 to set the element stored in the variable u as an analysis start point (506), and ends the entire processing (507). When the element stored in the variable u is not an entry indicating the occurrence of an exception (NO in 505), on the other hand, the analysis start point analyzing module 104 returns to the processing 503 to repeat the processing for the next element.

Through the processing described above, the analysis start point analyzing module 104 sets as an analysis start point a spot where exception processing has occurred during the execution of a program.

A concrete example of the third embodiment of this invention is described below.

FIG. 21 is a diagram illustrating an example of the execution log set according to the concrete example of the third embodiment of this invention. The execution log set includes an item number column 1701, which indicates an order relation, and an event column 1702, which indicates for each item number in the item number column 1701 the specifics of an event associated with the item number. In the example of FIG. 21, an entry 1703 having an item number "#3" is processing that indicates the occurrence of an exception.

The analysis start point analyzing module 104 first stores the execution log set of FIG. 21 in the execution log set T through the processing 502 of FIG. 20 (502). The analysis start point analyzing module 104 then determines whether or not the execution log set T is an empty set (503). Because the execution log set T is not an empty set (NO in 503), the analysis start point analyzing module 104 proceeds to the processing 504 to take one element ([#1, call C0.doPost]) out of the execution log set T and store the element in the variable u (504).

The analysis start point analyzing module 104 then determines whether or not the element stored in the variable u is an entry indicating the occurrence of an exception (505). Because the element that has just been stored in the variable u ([#1, call C0.doPost]) is not an entry that indicates the occurrence of an exception (NO in 505), the analysis start point analyzing module 104 returns to the processing 503 to execute the processing for the next element ([#2, call C1.doPost]). By repeating the processing 503 to the processing 505, the analysis start point analyzing module 104 sets as an analysis start point an element that is an entry indicating the occurrence of an exception ([#3, Exception in thread "main"]) (506), and ends the entire processing (507).

The analysis start point analyzing module 104 can set the entry 1703 of FIG. 21 as an analysis start point through the processing described above. The target program 108 (see FIG. 1) that corresponds to this type of execution log is illustrated in FIG. 22.

FIG. 22 is a diagram illustrating the target program 108 according to the concrete example of the third embodiment of this invention. The target program illustrated in FIG. 22 which is denoted by 1601 is a logic layer program as an example of the target program 108. The target program 1601 realizes a single service (service defined by a class C2).

In the example of FIG. 22, a method C2.m2 (statement (d)) is processing that indicates the occurrence of exception. This means that the statement (d) can be set as an analysis start point by the control logic described above with reference to FIG. 20.

According to the third embodiment of this invention described above, the statement (d) which is the spot where program malfunction has occurred can be set automatically as an analysis start point. Thereafter, the method described in the first embodiment is used to analyze a path to a statement that is the spot of the cause of the malfunction by following the path backwards, and to present the path to the user. This enables the user to easily identify the spot of the cause of program malfunction based on the spot where the malfunction has occurred.

This invention has been described in detail with reference to the accompanying drawings. However, this invention is not limited to those concrete configurations, and encompasses various modifications and equivalent configurations that are within the spirit of the scope of claims set forth below.

Industrial Applicability

This invention relates to an application analysis method, and is particularly useful in identifying the contributing factor for an invalid operation of a program in a 3-tier architecture Web application.

What is claimed is:

1. An application program analysis method used by an analysis system that comprises a processor for executing an application program comprising a plurality of program statements and a plurality of database operation statements and a memory for storing the application program executed by the processor for analyzing the application program, the application program analysis method comprising:
   a first step of analyzing, by the processor, a control flow of the application program and execution data used in the application program based on the application program and an execution result of the application program;
   a second step of analyzing, by the processor, a dependency relationship among the plurality of database operation statements of the application program based on a result of the analysis of the first step and specifics of operations of the plurality of database operation statements of the application program;
   a third step of analyzing, by the processor, based on the result of the analysis of the first step and a result of the analysis of the second step, a propagation route of an invalid operation of the application program by using, as an analysis start point, a given spot of the invalid operation in the application program, and following the control flow of the application program backwards to obtain program statements of the application program on the propagation route; and
   a fourth step of presenting, by the processor, the program statements of the application program on the propagation route obtained in the third step to a user.

2. The application program analysis method according to claim 1, wherein the third step comprises a step of limiting, by the processor, in number, program statements of the application program to be presented by removing program statements of the application program that are not to be presented from the program statements of the application program on the propagation route which have been obtained in the third step.

3. The application program analysis method according to claim 1, wherein the fourth step comprises presenting, by the processor, a path set that indicates execution routes of the program statements of the application program on the propagation route which have been obtained in the third step.

4. The application program analysis method according to claim 1, wherein the fourth step comprises presenting, by the processor, the program statements of the application program on the propagation route which have been obtained in the third step, in association with a program structure of the application program.

5. The application program analysis method according to claim 1, further comprising, between the second step and the third step, a step of setting, by the processor, a spot specified by the user as the analysis start point.

6. The application program analysis method according to claim 1, further comprising, between the second step and the third step, a step of setting, by the processor, a spot where exception processing has occurred during execution of the application program as the analysis start point.

7. An analysis system comprising a processor for executing an application program comprising a plurality of program statements and a plurality of database operation statements and a memory for storing the application program executed by the processor for analyzing the application program, the processor being configured to:
   analyze a control flow of the application program and execution data used in the application program based on the application program and an execution result of the application program;
   analyze a dependency relationship among the plurality of database operation statements of the application program based on a result of the analysis of the control flow of the application program and the execution data used in the application program and specifics of operations of the plurality of database operation statements of the application program;
   analyze, based on the result of the analysis of the control flow of the application program and the execution data used in the application program and a result of the analysis of the dependency relationship among the plurality of database operation statements of the application program, a propagation route of an invalid operation of the application program by using, as an analysis start point, a given spot of the invalid operation in the application program, and following the control flow of the application program backwards to obtain program statements of the application program on the propagation route; and
   present the obtained program statements of the application program on the propagation route to a user.

8. A non-transitory recording medium having stored thereon an analysis program used by an analysis system comprising a processor for executing an application program comprising a plurality of program statements and a plurality of database operation statements and a memory for storing the application program executed by the processor for analyzing the application program, the analysis program controlling the analysis system to execute:
   a first step of analyzing a control flow of the application program and execution data used in the application program based on the application program and an execution result of the application program;
   a second step of analyzing, a dependency relationship among the plurality of database operation statements of the application program based on a result of the analysis of the first step and specifics of operations of the plurality of database operation statements of the application program;
   a third step of analyzing, based on the result of the analysis of the first step and a result of the analysis of the second step, a propagation route of an invalid operation of the application program by using, as an analysis start point, a given spot of the invalid operation in the application program, and following the control flow of the application program backwards to obtain program statements of the application program on the propagation route; and a fourth step of presenting the program statements of the application program on the propagation route obtained in the third step to a user.

* * * * *